July 23, 1957      H. E. SLOIER      2,800,152
COFFEE DISPENSING MACHINE
Filed June 7, 1954      6 Sheets-Sheet 1

INVENTOR.
HAROLD E. SLOIER,
BY
H. Calvin White
ATTORNEY.

July 23, 1957

H. E. SLOIER 2,800,152

COFFEE DISPENSING MACHINE

Filed June 7, 1954

INVENTOR.
HAROLD E. SLOIER,
BY
ATTORNEY.

United States Patent Office 2,800,152
Patented July 23, 1957

2,800,152

COFFEE DISPENSING MACHINE

Harold E. Sloier, Sherman Oaks, Calif., assignor to Mission Appliance Corporation, a corporation of California Application June 7, 1954, Serial No. 434,967

17 Claims. (Cl. 141—104)

This invention relates to improved dispensing apparatus, and particularly to devices for dispensing successive cups of coffee, desirably under the control of a coin responsive mechanism.

In a machine for dispensing coffee, it is necessary to provide means for separately feeding several different ingredients to a delivery location. These ingredients comprise water, coffee, cream and sugar, the last three of which are usually in a dry powdered or granular form. The three dry ingredients may be stored in individual containers in the dispenser housing, and may be dispensed from the containers, upon each operation of the machine, by a number of individual screws or other dispensing elements, which are desirably rotatably mounted to the containers.

It frequently becomes desirable, in servicing a machine of the above character, to remove the ingredient holding containers from the housing for cleaning or refilling. The provision for such removability of the containers, however, is somewhat complicated by the necessity for also providing means to drive the dispensing screws or elements when the containers are in their active positions in the housing. As will appear, these dispensing elements are preferably driven by individual electric motors which are mounted in the housing, and are not removable with the containers and screws.

In this regard, a major object of the present invention is to provide a unique type of driving connection between the feed elements and their driving motors, such that the connections may effectively transmit driving force to the feed elements when in use, and yet can be very easily disengaged to facilitate removal of the containers from the housing. Preferably, the drive connections are adapted to be engaged and disengaged merely by movement of the containers into and out of their active positions in the housing, and without the necessity for any additional connecting or disconnecting operations. As will appear, each drive connection may include two members, desirably two bevel gears, one of which is movable into power transmitting engagement with the other solely by virtue of the defined container movement. For best results, the engaging bevel gears may have their axes extending perpendicularly one to the other, and may more specifically be of the type known as miter gears, in which the engaging faces of each pair of gears extend at angles of 45 degrees to the gear axes. The housing may have a front door through which the interior of the device is accessible, in which case the bevel gears or other drive connections may be at the rear of the containers away from the door to further facilitate removal of the containers.

An additional feature of the invention resides in a novel type of mounting connection for holding the container or contaiers in their active positions in the housing. These connections, like the drive connections, may be adapted to be made and broken solely by movement of the containers themselves. Each mounting connecting may include first interfitting means carried by the container and housing respectively near a first side of the container (desirably the front) and movable into interfitting engagement by horizontal (preferably rearward) movement of the container; and second interfitting means near an opposite side of the container (the rear) and movable into interfitting engagement by vertical movement of that side of the container. The second interfitting means may hold the container against movement in a direction for releasing the first interfitting means.

The drive connections may be adapted to automatically release if the resistance to turning of the feed elements or screws becomes too great, as from caking of the ingredients. For this purpose, where the drive connections are of a bevel gear type, the gear teeth may be so tapered as to effect the desired automatic release of the connections, and the container mounting connections may be designed to allow limited gear disengaging movement of the containers without entirely breaking the mounting connections.

The feeding of coffee, cream and sugar from the containers may be controlled by individual cam operated electric switches. A further object of the invention is to provide an improved arrangement for adjusting the period of actuation of these switches, upon each operation of the machine, to thereby vary the amounts of the varius ingredients delivered. Specifically, I may provide for adjusting the operation of each switch by mounting the switch and cam for adjusting movement in a manner to shift the location along the cam surface at which the switch is actuated between open and closed conditions. Desirably, the cams are all mounted for rotation about a fixed axis, and the switches are individually movable relative to the cams.

The dispenser may include a manually operable handle, adapted to mechanically operate a cup dispensing device, and acting also to set in operation the electrically controlled apparatus for delivering a drink into a dispensed cup. The electrically controlled drink dispensing apparatus may be designed to become effective only after a cup has been completely dispensed.

The above and other features and objects of the present invention will be better understood from the following detailed description of the typical embodiment illustrated in the accompanying drawings, in which.

Figure 1:
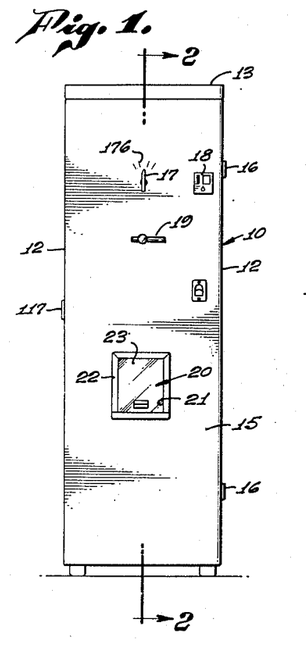
Fig. 1 is a front view of a coffee dispensing machine constructed in accordance with the invention.
Figure 2:
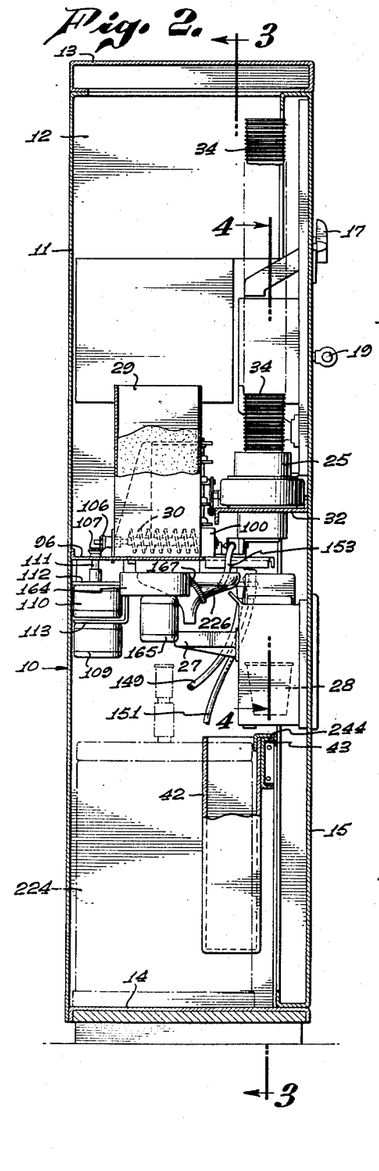
Fig. 2 is an enlarged vertical section taken on line 2—2 of Figure 1.
Figure 3:
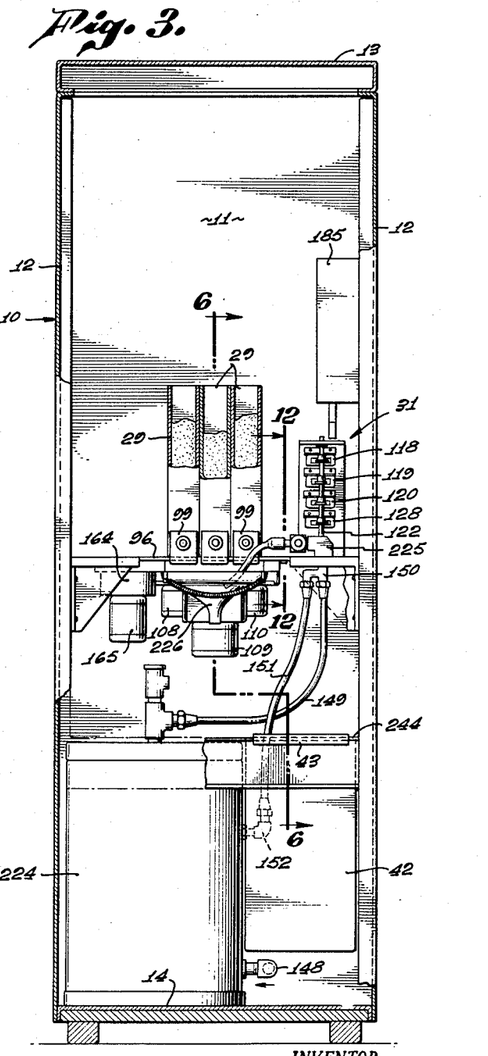
Fig. 3 is a vertical section taken on line 3—3 of Fig. 2.

Referring first to Figs. 1, 2 and 3, the illustrated coin controlled coffee dispenser includes an upstanding typically rectangular housing 10, having a rear wall 11, two side walls 12, a top 13, and a bottom wall 14. At its front side, housing 10 has a vertically extending door 15, which may be formed of sheet metal and extend entirely across the front of the housing, and which is mounted at one side by hinges 16 for outward swinging movement relative to the rest of the housing to an open condition in which it allows access to the interior of the housing for refilling it with materials to be dispensed, or for repair. At the opposite side or edge of door 15, a lock or latch 117 may be provided for retaining the door in its closed condition.

A person using the machine first turns selector handle 17 to a desired position, to determine whether the drink to be dispensed will be black coffee, or will contain sugar or cream, or both. The operator then inserts a coin into the coin actuated switch mechanism, typically represented at 18, and after insertion of the coin is able to swing actuating arm 19 to set the dispensing mechanism in operation. When thus operated, the mechanism within the housing acts to deliver a cup filled with coffee to a discharge location 20 which is directly behind an access opening 21 formed in door 15 of the housing. A rectangular frame 22 may be mounted in access opening 21, and may support a transparent glass or plastic door 23 for vertical sliding movement to an upper retracted position in which the operator may reach through the frame to remove the cup and contained coffee. Desirably, the various control and access parts 17, 18, 19, 22 and 23 are all carried by the door 15 of the housing.

Internally, the dispensing mechanism includes a pair of conventional cup dispensers 24 and 25, which are mechanically actuated by arm 19 through a mechanism generally indicated at 26 and carried along the inner side of the door. After a cup has been ejected to the delivery location 20, the dispensing mechanism becomes effective to deliver powdered coffee and water into the cup, and if desired, sugar and powdered cream are also supplied. The hot water is fed from an electrically heated tank 224 in the bottom of the housing, with the amount of water being regulated to make exactly one cup full of coffee by a control valve 225. From valve 225, the water discharges into a funnel element or mixing chamber 226, which delivers the coffee downwardly into a chute 27 for flow into the ejected cup 28.

The powdered coffee and cream, and the sugar, are contained within three removable containers 29, from which the dry materials for making the coffee are fed in proper amounts by individual motor driven screws 30 into funnel member 226 for mixing with the water. The operation of water valve 225 and the three feed screws 30 is controlled by a motor driven timing unit 31.

Figures 4, 5:
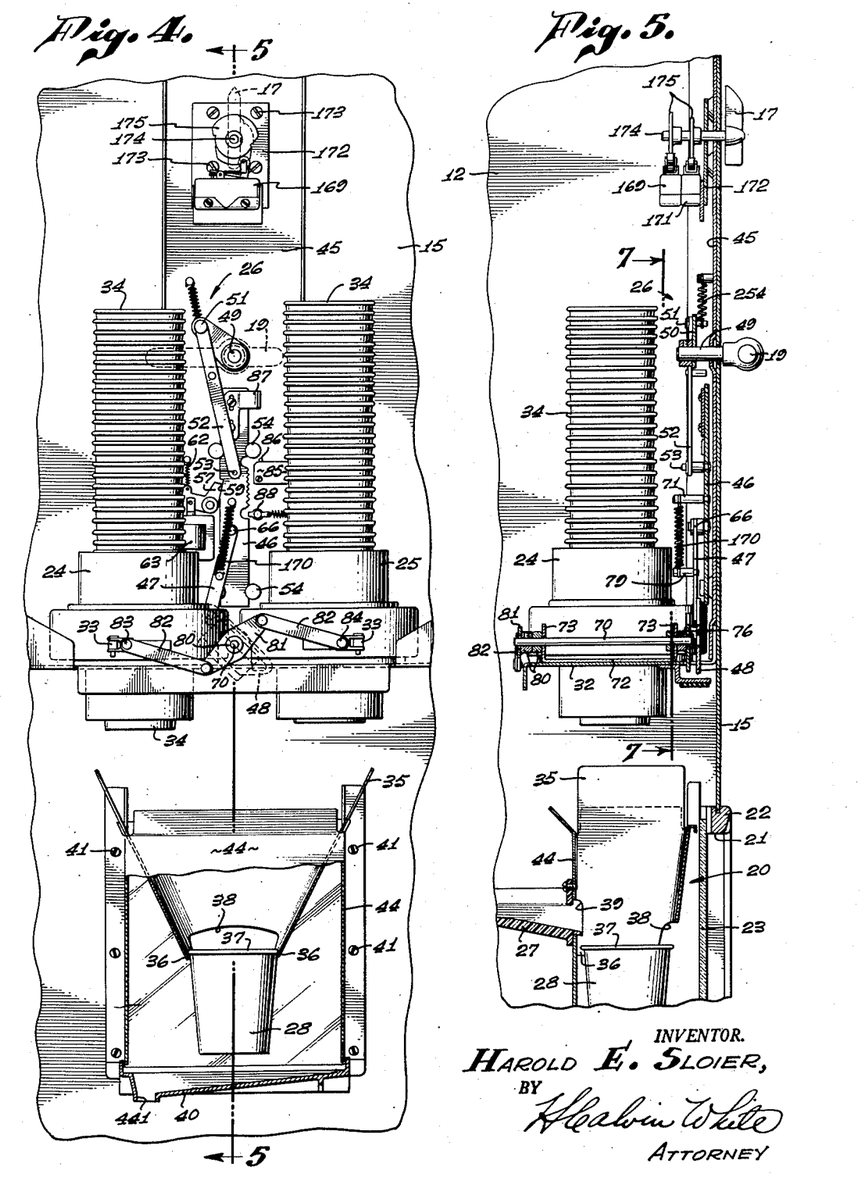
Fig. 4 is a further enlarged fragmentary section taken on line 4—4 of Fig. 2.
Fig. 5 is a fragmentary section taken on line 5—5 of Fig. 4.

The two cup dispensers 24 and 25 are mounted in side by side relation at the rear of the door 15 within a pair of openings formed in a horizontal support element or plate 32 which is carried by and projects rearwardly from the door. Dispensers 24 and 25 are of the conventional and well known type in which a horizontally moving or swinging and laterally projecting arm 33 acts by its swinging movement to successively drop downwardly individual ones of the vertically nested and stacked paper cups 34. Movement of each of the arms 33 in one horizontal direction acts to dispense one cup from the underside of the corresponding dispenser 24 or 25, while movement of the arm in the reverse direction does not dispense the next successive cup but merely cocks the mechanism for a subsequent cup dispensing movement in the first mentioned direction. As will appear later, the two arms 33 of the two dispensers 24 and 25 are connected together for operation simultaneously by operating arm 19, but are connected reversely so that successive operations of arm 19 act to alternately dispense cups from the two dispensers 24 and 25.

A cup ejected from either of the two dispensers 24 or 25 falls downwardly into a cup holding element 35, which may be made of sheet metal, and forms a downwardly tapering throat, for directing each cup, as it is ejected, downwardly to the filling position illustrated in Fig. 4. In this position, the ejected cup is supported by a pair of downwardly projecting fingers 36 formed at the lower end of member 35, which fingers 36 engage opposite sides of the upper edge of the cup at points directly beneath the upper rim 37 of the cup, to support the cup from its upper edge portion. In the filling location of Fig. 4, the cup suspended by member 35 is of course accessible to an operator of the machine through the front opening 21 in door 15. The cup receiving and holding member 35 may extend continuously about the downward path of ejected cups, except at the location of a lower front opening 38 through which the cup is removed from the holder, and a rear opening 39 through which the coffee is filled into the cup. The cup holding location may be closed at its opposite sides and at its back by a wall member 44, which is attached to the door by screws 41, and serves to define the previously mentioned delivery location 20. Beneath cup holder 35, the bottom of member 44 is closed by an inclined bottom wall 40, from which any overflow of liquid drops through an opening 441 into a waste container 42. The waste container may typically be supported in its illustrated position within the housing by means of a supporting flange 43 carried by an upper edge of the waste container and receivable over a transverse support member 244 which is attached rigidly to and extends across the interior of the housing. Filling chute 27 and cup holding element 35 may be suitably rigidly carried by element 40 which forms the walls about the delivery location.

The mechanism 26 for operating the two cup dispensers 24 and 25 is carried in large part by a rigid vertically extending preferably sheet metal supporting plate 45, which is fastened in fixed position to the inner side of door 15. This plate 45 carries at its inner side a relatively vertically slidable and vertically elongated member 46, which is actuated downwardly and then returned upwardly upon each operation of the machine. Successive downward actuations of member 46 act through a swinging over center arm 47 to alternately turn a member 48 in opposite rotary directions between the full line and dot dash line positions of Fig. 8. This member 48 is connected in turn to arms 33 of the cup dispensers 24 and 25, through a mechanism later to be described, to operate the cup dispensers in accordance with movement of member 48.

The operating arm 19 at the outside of the housing is rigidly attached to, and acts to turn, a shaft 49 (see Fig. 5), which projects through door 15 and support plate 45. At the inner side of the door and plate 45, shaft 49 carries an arm 50, which is pivotally attached at 51 to an end of a link 52, whose other end is pivotally attached at 53 to slide member 46. Swinging movement of arm 19 by an operator then acts through elements 50 and 52 to move slide 46 downwardly from its Fig. 4 position to its Fig. 7 position, with the slide being returned upwardly by a coil spring 254 connected at its upper end to plate 45 and at its lower end to the pin which forms the pivotal connection at 51 between elements 50 and 52. Member 46 is guided for its indicated vertical sliding movement by several, typically four, guide elements or pins 54 carried by plate 45. These guide elements 54 have first reduced diameter portions 55 engaging opposite sides of element 46, and have inner enlarged diameter heads 56 spaced from plate 45 and retaining element 46 against that plate.

Figures 7, 8, 9:
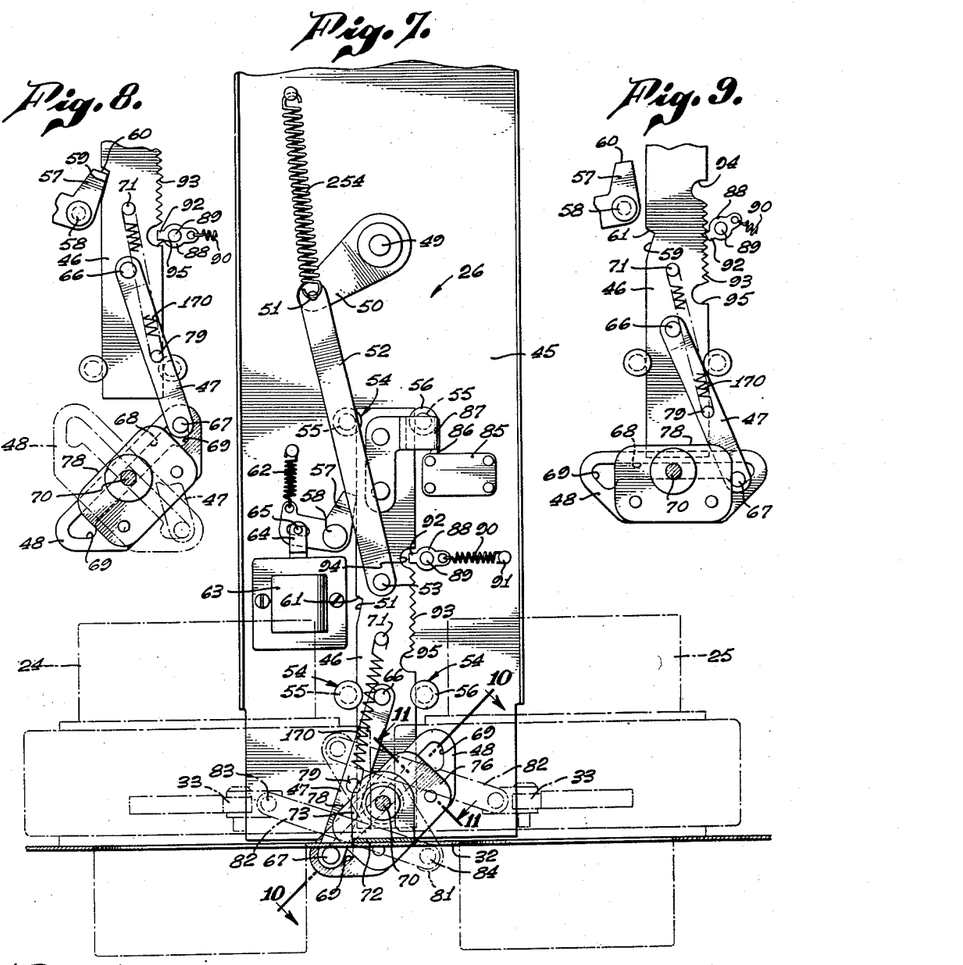
Fig. 7 is an enlarged vertical section taken on line 7—7 of Fig. 5 showing in full lines the portion of the cup dispenser mechanism which is carried directly adjacent the door of the housing, and showing in phantom lines the rest of the cup dispensing mechanism (though the portion shown in phantom lines is actually positioned behind the line of sight 7—7, and therefore would not be seen in a true section taken on that line)
Fig. 8 shows a portion of the mechanism just prior to a cup dispensing portion.
Fig. 9 shows the Fig. 8 mechanism during a cup dispensing operation.
Figure 10:
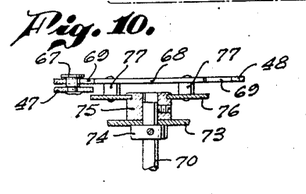
Figs. 10 and 11 are sections taken on line 10—10 and 11—11 respectively of Fig. 7.
Figure 11:
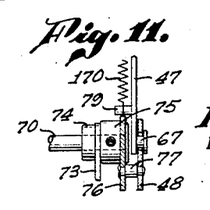
Figure 12:
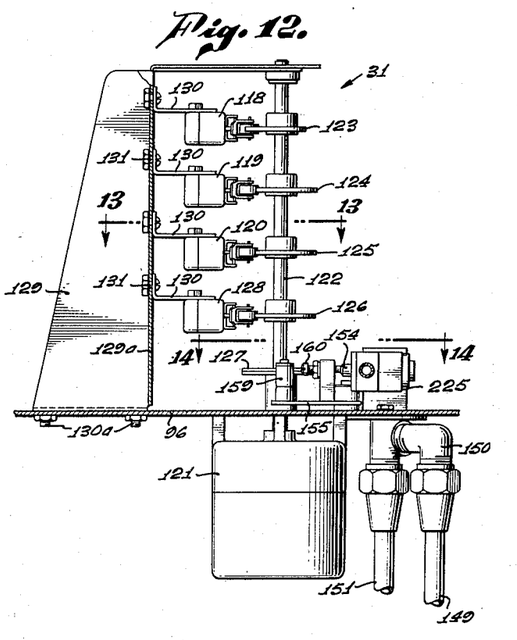
Fig. 12 is an enlarged view partially broken away taken on line 12—12 of Fig. 3, and showing the timing mechanism.

Until a coin is inserted into the coin controlled switch unit 18, slide element 46 is positively held against downward cup dispensing actuation by a latch element 57, which is pivotally mounted at 58 to plate 45, and which is receivable within a notch 59 formed in a side of element 46, to retain that element against downward movement. More specifically, when in its Fig. 8 position, the upper face 60 of latch element 57 is positioned for engagement with a downwardly facing latch surface 61 forming an upper wall of notch 59, with surfaces 60 and 61 extending at such an angle as to effectively and positively prevent downward movement of element 46. Latch element 57 is yieldingly urged toward its Fig. 8 latching position by means of a coil spring 62, which is connected at its opposite ends to plate 45 and the latch element. A solenoid 63 acts when electrically energized to swing latch element 57 in a counterclockwise direction as seen in Figs. 7 through 9, to retract the latch element out of notch 59 and thus free member 46 for downwardly cup ejecting movement. In Fig. 7, the armature of the solenoid is illustrated at 64, and is connected to an arm of latch 57 by a pin and slot connection 65.

The overcenter arm or link 47 is pivotally attached at its upper end 66 to element 46 for swinging movement about a horizontal axis, and carries at its lower end an inwardly projecting horizontally and desirably cylindrical pin 67. This pin is movably received within an elongated slot 68 formed in member 48, with two notches or enlargements 69 being formed at opposite ends of the slot. The width of slot 68, except at the location of notches 69, is preferably approximately equal to the diameter of pin 67, to confine the pin for desired movement along the slot. Member 48 lies in a vertical plane and is rigidly carried by a horizontal shaft 70, which is mounted for limited rotary movement with member 48 about the horizontal axis of the shaft. This rotary movement is limited at the full line and broken line positions of Fig. 8, member 48 being actuable from one of these positions to the other upon each operation of handle 19.

Prior to each downward operation of element 46, overcenter element 47 is so positioned that its carried pin 67 is received within whichever end of slot 68 then happens to be directed upwardly. For instance, in the full line position of Fig. 8, pin 67 is received within the right hand end of slot 68. In this condition, an overcenter coil spring 170 acts to yieldingly urge element 47 toward the right as seen in Fig. 8, this spring being connected at its opposite ends to a traversely central portion of element 47, and a pin 71 mounted to slide member 46 at a point directly above and in vertical alinement with the pivotal connection 66 between elements 46 and 47. When element 47 is subsequently swung over to the opposite side of a central directly downwardly projecting position, as will later appear, overcenter spring 170 reverses its action and tends to urge the element 47 to the left rather than to the right as seen in Fig. 8.

The shaft 70 which mounts member 48 for its limited rotary movement extends rearwardly between the two cup dispensers 24 and 25, and preferably is directly perpendicular to the plane of plate 45. The shaft may be mounted on plate 32 by means of a U-shaped bracket 72 carried by plate 32 and having two spaced upwardly projecting arms 73 containing openings through which shaft 70 extends (see Fig. 5). Toward the forward end of shaft 70, a pair of rings 74 and 75 may be secured to the shaft, as by suitably set screws, with these rings 74 and 75 being received in spaced relation and at opposite sides of one of the mounting arms 73 to retain the shaft against axial movement. The forward one of these rings 75 carries a transverse plate 76, to which the previously described slotted element 48 is rigidly attached in spaced relation, as by a pair of connectors 77. In this manner, element 48 is rigidly connected to shaft 70 to transmit swinging movement of the former to the latter.

The notches 69 formed at the ends of slot 68 in element 48 are so shaped that, when slide member 46 and element 47 are moved downwardly, the pin 67 carried at the end of element 47 nests within the upper one of the two notches 69 and causes that end of the slotted element 48 to swing downwardly. For this purpose, each notch is so designed that, even when one of the notches is in its uppermost position (for instance, the position of the right hand notch in full lines in Fig. 8), the notch forms an upwardly facing cavity for receiving pin 67, so that the pin cannot slip out of the notch and slide downwardly along slot 68. When elements 46 and 47 have moved downwardly to the lower extent of their travel, for example, to the Fig. 7 position, element 47 is cammed laterally outwardly in a manner assuring a full downward travel of the parts. For this purpose, element 76 has an upper camming surface 78, which may extend parallel to slot 68, and which is engageable by pin 79 (typically the same pin to which spring 170 is connected) during the final stages of downward movement of elements 46 and 47, to positively cam element 47 laterally in a manner moving pin 67 out of notch 69 and into alinement with the main portion of slot 68. Overcenter spring 170 of course also tends to move pin 67 out of notch 69 at the lower end of a cup dispensing actuation, but the described camming effect is provided to render more positive the displacement of the pin out of the notch.

The rear end of shaft 70 carries a pair of rings 80, which are suitably retained against movement relative to the shaft, as by set screws connected into the rings and bearing against the shaft. The rear one of these rings 80 rigidly carries a double ended lever 81, the opposite ends of which are pivotally attached to a pair of links 82, which are pivotally connected at 83 and 84 to the two dispenser actuating arms 33 respectively. As will be apparent, by virtue of the connection formed by lever 81 and links 82, rotary movement of shaft 70 and lever 81 in a first rotary direction (counterclockwise as seen in Fig. 4) moves arms 33 relatively toward one another, while reverse rotation of the shaft and lever 81 moves arms 33 relatively away from each other. The movement of arms 33 toward each other causes one of the dispensers 24 or 25 to effect a cap, while at the same time cocking the other dispenser; and the reverse movement of arms 33 away from each other causes the second dispenser to eject a cup while cocking the first.

The cup dispensing movement of lever 81 and links 82 is caused by the rotation of shaft 70 which results from the previously described swinging movement of element 48 upon downward actuation of slide member 46 and element 47. The parts are so designed that the swinging movement of element 48 produced upon each downward actuation of slide member 46 is just sufficient to actuate dispenser arms 33 through their full range of movement. Upon each such actuation, the actual ejection of a cup from one of the dispensers normally takes place at an intermediate point within the range of movement of arms 33 and somewhat before the arms reach the limit of their travel.

After elements 46 and 47 have been moved downwardly to swing element 48 in one direction through its permitted range of travel, as for instance in swinging element 48 from its full line position of Fig. 8 through the Fig. 9 position and to the broken line position of Fig. 8, the operator releases external handle 19 to permit upward returning movement of elements 46 and 47. During such upward movement, pin 67 carried by element 47 engages the upper edge of slot 68, which edge serves as a camming surface acting to deflect or cam the pin laterally as it moves upwardly within the slot, so that element 47 is moved laterally past its central directly downwardly projecting position, and pin 67 is positioned within the end of slot 68 which has just been swung by the last actuation to an upper position. Overcenter spring 170 then acts to retain pin 67 in that end of the slot, so that upon the next downward actuation of elements 46 and 47, pin 67 engages the second notched end of slot 68 and swings the element 48 and connected parts in a reverse direction. In this manner, successive downward actuations of elements 46 and 47 act to alternately swing element 48 and the connected dispenser actuating parts in opposite directions.

When elements 46 and 47 have moved downwardly on each actuation to substantially the lower end of their travel, and after the previously described parts have completed the dispensing of a cup from one of the dispensers 24 or 25, the final portion of the downward movement of element 46 serves to actuate an electric switch 85, which then closes a circuit causing the rest of the apparatus to dispense a drink into the ejected cup. This switch may be stationarily mounted to plate 45 and has a movable actuating element 86, which is engaged by an operating member 87 carried by and movable with element 46. The laterally projecting ear of element 87 is so positioned as to engage and move actuating element 86 only during the desired final portion of the downward movement of elements 46 and 47. The previously mentioned lateral camming of element 47 by engagement of pin 79 with cam surface 78 at the end of a downward actuation of elements 46 and 47, positively prevents pin 67 from being caught in the notch 69 in a manner which might otherwise stop the downward movement of elements 46 and 47 before operation of switch 85. As will later appear, switch 85 has two sets of contacts, a first of the sets being normally closed and designed to open when element 86 is depressed, and the second set being normally open and designed to close by depression of element 86.

Once a downward movement of slide element 46 is commenced, it is desirable to positively prevent reversal of the direction of movement of that element until it has been actuated through its complete range of travel. Similarly, once an upward returning movement of element 46 is commenced, it is desirable to prevent downward movement of the element until the upward movement has progressed to the Fig. 8 position of element 46. By thus preventing reverse movement of element 46, I prevent the dispensing of more than one cup or one drink upon a single operation of the machine. To prevent such reverse movement, I employ a ratchet-like element 88, which is pivoted for swinging movement about a horizontal pin 89 projecting from plate 45 at a side of slide member 46. A coil spring 90 is connected at one end to an outer portion of element 88, and at the other end to a pin 91 carried by plate 45, to normally yieldingly urge element 88 to its Fig. 7 position, while at the same time allowing either upward or downward swinging movement of the inner active end 92 of element 88 against the tendency of spring 90.

Along the side of slide member 46, there are formed a vertical series of teeth 93, which act to deflect element 88 out of their path of vertical movement when element 46 is moved either downwardly or upwardly. During downward movement of element 46, for example, element 88 is deflected by teeth 93 to its Fig. 9 position. As will be understood, when disposed angularly as shown in Fig. 9, element 88 is deflectable to allow further downward movement of element 46, but cannot be swung in a reverse direction (clockwise as seen in Fig. 9) to permit upward movement of element 46. Consequently, only downward movement of element 46 is permitted, until that element reaches the lower extent of its travel, at which point the inner end of element 88 is receivable within an enlarged notch 94 formed in element 46, and of a depth greater than the teeth. This notch is sufficiently large to permit element 88 to swing to its normal Fig. 7 position, so that upward movement of element 46 is permitted.

As element 46 then moves upwardly in returning to its normal position, the inner end 92 of element 88 is deflected upwardly by teeth 93, and assumes an angular position preventing downward movement of element 46 and permitting only its upward movement until that element reaches the upper end of its travel. When element 46 reaches that upper point, element 88 is received within a second and lower enlarged diameter notch 95, to again permit its return to normal position (see Fig. 8). During downward movement of element 46, it will of course be understood that the parts must be designed to actuate switch 85 just before element 46 is freed by element 88 for upward returning movement. Similarly, during upward movement of element 46, latch 57 moves into notch 59 just before element 88 moves out of engagement with the last tooth 93 and into notch 95.

Figure 6:
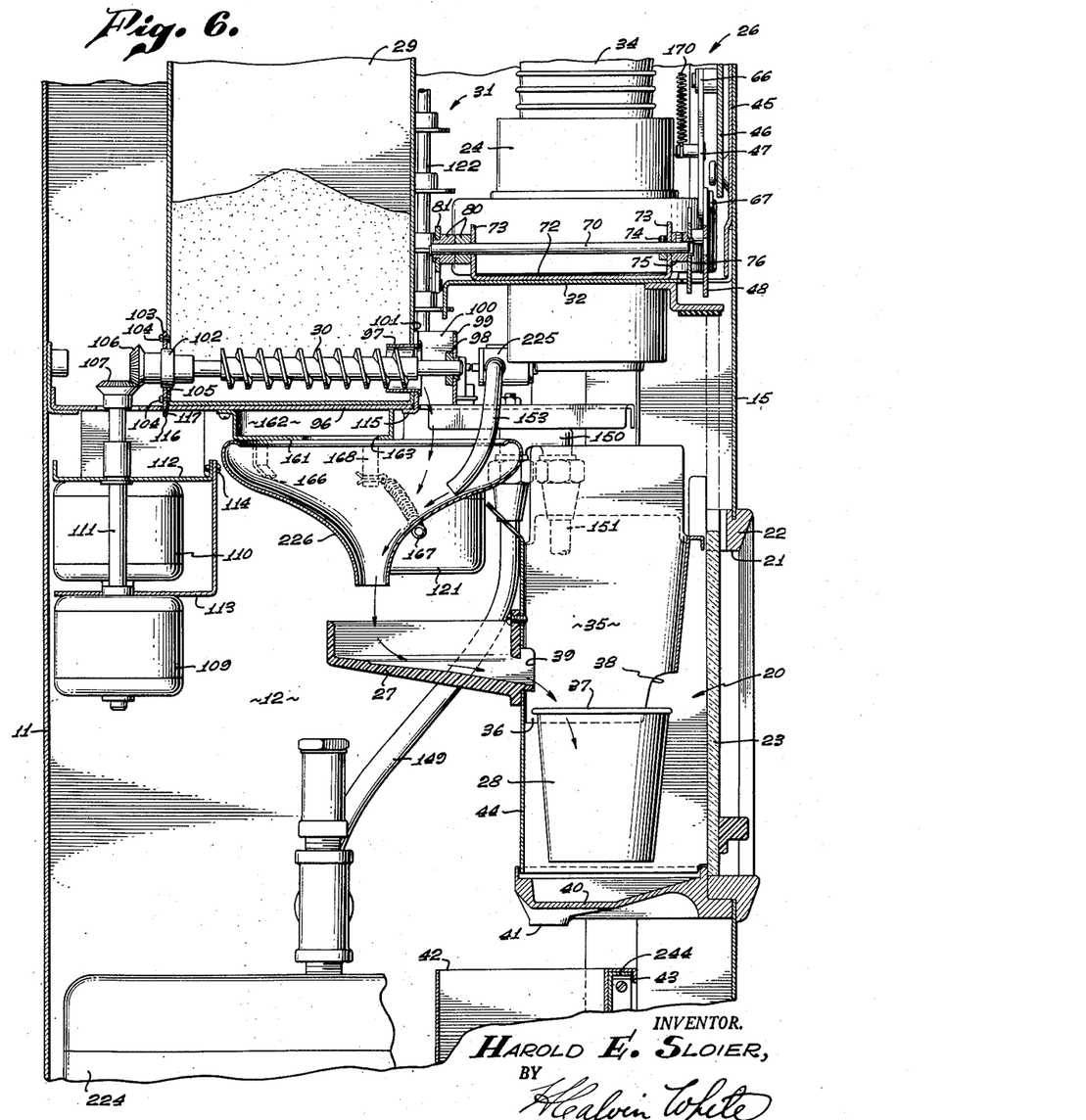
Fig. 6 is an enlarged fragmentary vertical section taken on line 6—6 of Fig. 3.

The three containers 29 for holding the granular or powdered coffee, cream and sugar are removably mounted in housing 10 on a horizontal supporting plate 96, which is attached stationarily to the housing walls. The three containers 29 may be essentially rectangular, and have rather small dimensions transversely of the housing, to be receivable on plate 96 in side by side engaging relation (see Fig. 3) and within a relatively small area. Each of the containers has in its lower portion one of the previously mentioned feeding screws 30 (see Fig. 6) which screws extend horizontally and have their axes mutually parallel and extending in a front to rear direction. The forward end of each screw 30 is received within a tubular outlet member 97, which is connected into an opening at the front of the corresponding container, and which has an internal diameter corresponding substantially to the internal diameter of the screw, so that rotation of the screw acts to progressively feed the dry powered or granular material out the forward end of the container to fall into funnel 226. The forward ends of screws 30 are journalled within bearings 98, which may be carried by walls 99 attached to the containers and spaced forwardly from their discharge tubes 97. Each of these walls 99 may comprise a portion of a sheet metal member 100, which is attached to the corresponding container in any suitable manner, as as welding at 101 of an inner portion of this member to the container.

A rear extension of each screw 30 is journalled within a bearing 102, which may be rigidly carried by a plate 103 removably attached to the rear side of the associated container, as by spaced screws 104. At the location of bearing 102, the rear wall of the container has an opening 105 of a diameter larger than screw 30, so that when a container is removed from the housing and screws 104 are detached, the entire unit comprising plate 103, bearing 102 and screw 30 may be removed rearwardly from the container for cleaning. The forward bearing or bushing 98 is of course so designed as to allow such rearward removal of the forward end of the screw shaft from that bearing.

Rearwardly beyond bearing 102, the shaft or element on which screw 30 is formed carries a bevel gear 106, which is driven by a mating upwardly facing bevel gear 107 connected to an associated electric drive motor. Three such motors are provided at 108, 109 and 110, for driving three screws 30 within the different containers 29. These motors 108, 109, and 110 are located beneath a rear portion of supporting plate or shelf 96, and drive spaced vertically extending parallel shafts 111 which carry bevel gears 107 at their upper ends. Two of the motors 108 and 110 may be attached to a mounting plate 112, which is connected to and spaced beneath shelf 96, while the intermediate motor 109 may be mounted at a lower location to a lower plate 113, which may typically be attached to upper plate 112 at 114. The plates 112 and 113 are of course so designed as to mount motors 108, 109 and 110 in fixed positions relative to the housing.

The bevel gears 106 and 107 are moved into screw driven interengagement merely by positioning containers 29 in their illustrated positions on shelf 96. When containers 29 are removed from the shelf for cleaning, filling or repair, the drive connections formed by bevel gears 106 and 107 are automatically broken.

The containers are also so designed as to be connectable to shelf 96 by mere movement of the containers into their operative positions on the shelf. Such connection of the containers to the shelf is effected by means of shelf engaging tabs or lugs 115 and 116 formed at the front and rear respectively of each container. The front tab 115 may typically comprise a downward extension of the member 100, which forms the forward bearing mounting wall 99. This tab may extend downwardly at the forward bottom edge of the container, and then be turned rearwardly to extend rearwardly and horizontally at a location spaced below the bottom of the container, so that the forward edge of shelf 96 may be slidably received between the bottom of the container and the horizontal portion of tab 115. The rear tab 116 of each container may comprise merely a downward extension of plate 103, this tab being receivable within a transverse opening 117 formed in a rear portion of shelf 96.

In attaching one of the containers 29 to shelf 96, the container is first held with its rear portion tipped slightly upwardly, and is then moved rearwardly at a location such as to cause tab 115 to be received beneath the forward edge of shelf 96. Rearward movement of the container in this manner causes the forward edge of the shelf to be locked between tab 115 and the bottom of the container, to thus retain the forward edge of the container against upward movement. After the container has moved rearwardly to the Fig. 6 position, tab 116 can fall into opening 117 to thus lock the container against forward movement, and prevent breaking of the connection formed by tab 115. This interlocking of tabs 115 and 116 with shelf 96 brings the container into a position in which its carried bevel gear 106 properly engages the driving gear 107, so that the associated motor acts when energized to turn the screw 30 mounted in the container.

Figure 15:
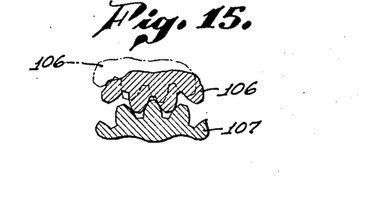
Fig. 15 is a section taken through the engaging teeth of the two bevel gears which drive one of the dispensing screws of the device.

The two bevel gears 106 and 107 are desirably formed with teeth which taper outwardly and preferably symmetrically toward their peaks (see Fig. 15), so that if clogging of the screw 30 offers excessive resistance to turning of the screw, the tapered faces on the gear cause the gears to wedge apart and out of driving interengagement. That is, when this excessive resistance is offered, the housing carried gear 106 and the rear portion of the housing are wedged upwardly by virtue of the tapered configuration of the gear teeth, to interrupt the drive to screw 30 before any damage can result. The connection formed by tab 116 and shelf opening 117 permits such upward movement of the rear portion of the housing. Tab 116 is of a length such that, even after the rear portion of the housing and gear 106 are deflected upwardly to a non-power transmitting position, the tab 116 still interfits with opening 117 and thereby still holds the container 29 in substantially its active position on the shelf.

The energization of screw driving motors 108, 109 and 110 is controlled by three cam operated electric switches 118, 119 and 120, which form portions of the timing mechanism represented generally at 31. This mechanism includes also a timing motor 121, which is suitably mounted to the underside of shelf 96, and which drives a vertically extending shaft 122 projecting upwardly through and above the shelf. Shaft 122 carries five spaced cams 123, 124, 125, 126 and 127, which actuate the three switches 118, 119 and 120, as well as a fourth timer motor controlling switch 128, and the water discharge controlling valve 225.

The four switches are mounted alongside shaft 122 and adjacent the corresponding cams by a support bracket 129, which may be formed of rigid sheet metal, and which typically has a horizontal base portion attached to shelf 96 by screws 130a. Bracket 129 preferably has a vertical portion 129a, to which are attached smaller angular brackets 130 for carrying the individual switches 118, 119, 120 and 128. Brackets 130 have first vertical portions extending alongside portion 129a of bracket 129, and adjustably attached thereto by screws 131. Two such screws may be provided for attaching each smaller bracket 130 to bracket 129, with these screws extending through horizontally elongated slots 132 in bracket 129, to allow limited horizontal adjusting movement of the smaller brackets relative to bracket 129.

The switch units 118, 119, 120 and 128 are attached to the underside of horizontal portions of the smaller brackets 130, these switch units being attached to brackets 130 by screws 133, which extend through elongated parallel slots 134 formed in brackets 130. Slots 134 are elongated in a direction extending generally toward and away from the axis of timer motor shaft 122, to allow for adjusting movement of the switch units toward and away from that shaft. Tightening of screws 131 and 133 of course fastens the switches in any desired adjusted position relative to the timer motor shaft and bracket 129.

Figure 13:
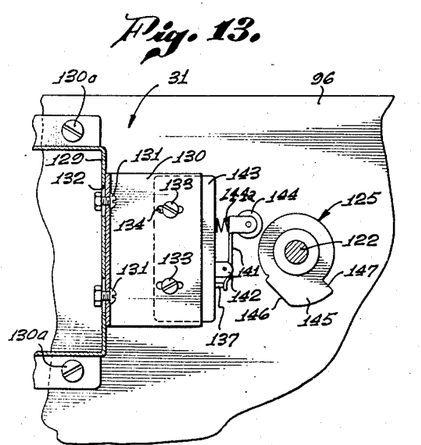
Figs. 13 and 14 are further enlarged fragmentary horizontal sections taken on lines 13—13 and 14—14 respectively of Fig. 12.
Figure 14:
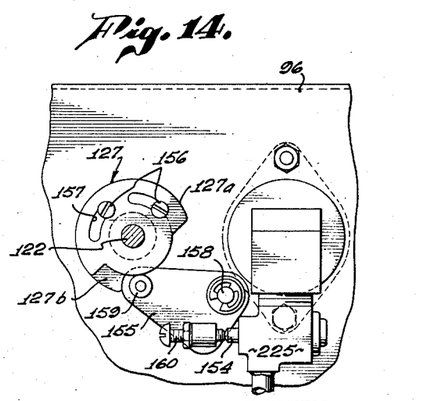

Each of the switches 118, 119 and 120 includes an actuating element 137 which is movable axially by a second and outer swinging actuating element or lever member 141, the latter being pivoted to a support 142 at the outer side of the switch housing 143. Lever 141 carries a roller 144 at its end, which roller engages the corresponding cam 123, 124, or 125, to actuate a set of contacts in the switch housing between closed and open positions in accordance with rotation of the cam. The switch contacts are so designed as to be closed by swinging movement of lever 141 in a counter clockwise direction as seen in Fig. 13 (against the tendency of spring 144a), resulting in rightward axial movement of element 137. Switch 128 is actuated by cam 126 through a lever 141 corresponding to lever 141 of switches 118, 119, and 120, but unlike those switches, is of a type having two sets of contacts, one of which is normally opened and the other of which is normally closed (as will be brought out more specifically at a later point).

Upon each operation of the machine, timing motor 121 acts to rather slowly drive shaft 122 through one complete revolution, and then stops. During this revolution, each of the cams 123, 124 and 125 closes the associated switch 118, 119, or 120 for a predetermined interval, to cause the corresponding screw 30 to dispense the desired amount of coffee, cream or sugar. The cams and switches are so designed as to permit regulation of the periods during which the various materials are dispensed, by the adjusting movement of the switches allowed by their described bracket mountings. In order to attain this result, each cam has an outwardly projecting switch engaging lug or projection 145, which is provided with an inclined leading surface 146. By the term "inclined surface," I of course means a surface which progressively and simultaneously extends both circularly and radially outwardly (see Fig. 13). The trailing end of each cam projection 145 may typically extend directly radially at 147. By virtue of the provision of this inclined leading surface 146 on the cam projection, the period of closure of each switch upon a single revolution of the timer shaft may be varied by movement of the switch toward or away from the shaft axis. By movement of switch 143 away from the axis of shaft 122 (see Fig. 13), the point at which the switch closes, as roller 144 rides about cam 125, is shifted or delayed circularly about the cam and along inclined surface 146. That is, if the switch is moved in a direction away from shaft 122, switch 120 closes at a later time, while the subsequent opening of the switch is unaffected, so that the overall period of closure is shorter, and the corresponding screw 30 is driven a shorter period of time and dispenses a smaller amount of material from container 29. The adjusting movement of the switches permitted by loosening of screws 133 and/or 131 allows for regulation of the period of screw operation through very wide limits while at the same time affording a very precise control. In this connection it is noted that, in order for the switches 118, 119, and 130 to afford the type of adjustment described, it is desirable that these switches be of a type in which the actuating element 141 is capable of movement in a closing direction beyond the position at which the switch first closes. During such movement beyond the initial closed position, the switch remains closed, to maintain the circuit closed as roller 144 rides outwardly along the inclined cam surface 146 and then along the outer arcuate surface of cam projection 145.

Describing now the water supply system, water is filled into tank 224 under pressure and as required through a fill line 148 connected to a conventional water supply system. An electric heater within tank 224 raises the temperature of the water to a desired value. The water then flows through a copper tubing 149 into a fitting 150, which connects into the underside of a water feed control valve 225. This valve 225 is mounted to the upper side of the previously mentioned shelf 96 within the housing. A recirculation line 151 may be provided to lead water downwardly from fitting 150 into tank 224 at a location 152, which location is spaced beneath the point of connection between line 149 and the tank. Since the temperature of the water at the upper end of tank 224 is greater than at point 152, a natural convective circulation of water is maintained from the upper end of the tank through line 149 to fitting 150, and then back through line 151 to the tank at point 152, so that the water at valve 225 is always hot, even though the apparatus may not have been used for a considerable period of time.

Water discharging from valve 225 flows into funnel 226 through a tube 153 (see Fig. 6), whose lower discharge end is so positioned that the materials fed by screws 30 into the funnel fall onto the flow of water passing downwardly within the funnel from line 153. That is, screws 30 deliver the coffee, cream and sugar onto the funnel at a point somewhat lower than that at which line 153 introduces the water, and a point along the path of water downflow. Water valve 225 is actuated by inward axial movement of an actuating pin 154, which is operated by cam 127 through a swinging crank member 155. The cam may be of a type formed of two superimposed sections 127a and 127b, which are relatively rotatable to vary the effective circular length of the cam projection, and which are retained in a set position by tightening a pair of screws 156, which are carried by section 127b and extend through arcuate slots 157 in section 127. Crank member 155 is mounted at 158 for pivotal movement about a vertical axis relative to shelf 96, and carries an upstanding roller 159 which engages and follows cam 127. Actuation of crank 155 by cam 127 is transmitted to valve operating pin 154 through an adjustable screw 160 attached to the crank. Valve 225 is of a known type which is automatically responsive to changes in pressure of the supplied water, in a manner such that, for any given setting of cam 127 and screw 160, the valve always delivers a certain predetermined quantity of water to the funnel upon each operation. The parts are then so adjusted that the quantity of water delivered upon each operation is just sufficient to make one cup of coffee, that amount being automatically delivered regardless of variations in water pressure. The water valve and cam are desirably so designed relative to the switch operating cams as to start the delivery of water upon each operation prior to the delivery of any of the solids (coffee, cream or sugar) into the funnel, and to continue the delivery of water for a substantial period of time after the delivery of the solids as needed. The solids then fall onto the water stream and are carried downwardly by it, and after the solid delivery is terminated, the final portion of the water acts to thoroughly clean the funnel.

At the underside of shelf 96, there is carried a sheet metal element 161, which forms with the shelf a horizontally extending space 162 communicating through an opening 163 with the upper side of funnel 226. At a location offset laterally from funnel 226, a blower 164 driven by an electric motor 165 connects into the underside of member 161, to draw air and fumes from the funnel through opening 163 and passage 162 into the blower, which then discharges the air and fumes through any suitable conduit to the outside of the housing.

The funnel 226 is desirably mounted in the housing by connection to the underside of member 161 which forms the air eduction passage. For this purpose, member 161 may carry a plurality of mounting fingers 166, projecting downwardly at spaced locations across a rear side of funnel 226, and having lower end portions turned inwardly beneath the upper portion of the funnel to support it against the underside of member 161. At its front side, funnel 226 may be retained by an elongated coil spring 167, which is attached at its opposite ends to a pair of lugs 168 extending downwardly from member 161 at diametrically opposed points on opposite sides of the funnel. The spring extends across a forward side of the funnel in a manner yieldingly urging the funnel rearwardly against positioning fingers 166, to effectively hold the funnel in its illustrated Fig. 6 active position. The funnel may be easily removed for cleaning by merely stretching spring 167 to a condition in which it allows the funnel to be removed forwardly from its active position.

The selector handle 17 at the front of the housing acts to control the addition of cream or sugar to the dispensed coffee, by operation of a pair of electric switches 169 and 171 mounted at the inner side of the housing door. These switches may be carried by a mounting plate 172, which is attached to plate 45 by screws 173. Handle 17 acts to turn a shaft 174, which projects through to the rear side of the door and carries a pair of cams 175 for operating switches 169 and 171. The selector handle 17 is actuable to any of four different positions, designated by markings 176 on the front of the housing door. In a first of these positions, both of the switches 169 and 171 are opened, so that neither sugar nor cream is dispensed and consequently black coffee is delivered upon operation of the machine. In the other three positions, the two switches are closed either individually or together, to cause the delivery of either cream or sugar, or both.

Figure 16:
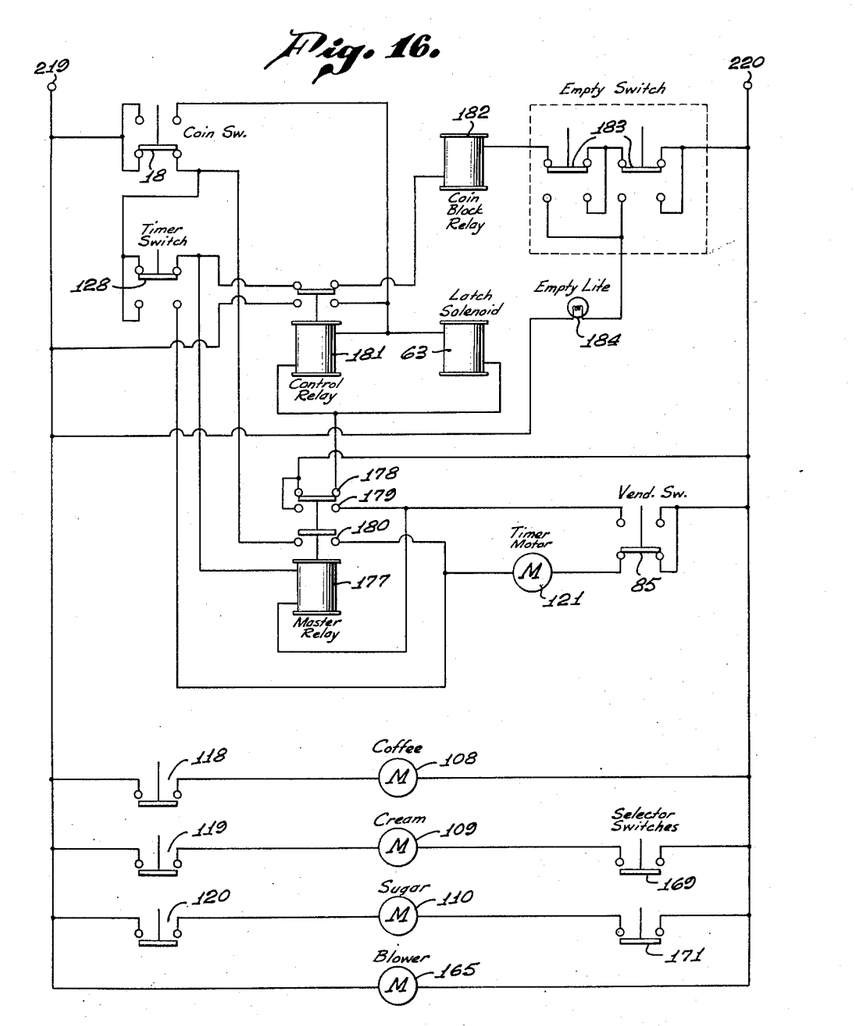
Fig. 16 is a schematic view of the electrical control circuit for the dispenser.

The electrical control circuit for the apparatus is shown diagrammatically in Fig. 16. Referring to this figure, the various electrical parts are energized by current from a pair of power supply leads 219 and 220, these leads typically being connected to a 110 volt A. C. power source. As seen at the bottom of Fig. 16, blower 165 is connected directly across the line voltage, to be continuously energized for drawing air and fumes from the funnel or mixing chamber 226. The three motors 108, 109 and 110 for operating the coffee, cream and sugar dispensing screws 30 are connected in individual series circuits with their three timer actuated control switches 118, 119 and 120 respectively. The circuits to the cream and sugar dispensing motors 109 and 110 also contain in series with the motors, the two selector switches 169 and 171.

The coin responsive switch 18 has two sets of contacts, the lower set of which is normally closed, and the upper set of which is normally open. When a coin is inserted into the coin responsive mechanism, it momentarily actuates the movable contact of switch 18 upwardly, to temporarily open the lower set of contacts of the coin switch 18, and temporarily close the upper set of contacts. After this momentary upward actuation of the movable contact in switch 18, that movable contact returns downwardly to the illustrated normal condition. The switch 85 is of a type similar to coin switch 18, and has a lower set of normally closed contacts and an upper set of normally open contacts. When switch 85 is actuated by element 87 at the end of a cup ejecting operation, the movable element of that switch acts to automatically close the upper contacts and open the lower contacts, and then return to the illustrated normal condition as soon as element 87 releases the actuating member 86 of switch 85.

The timer switch 128 has upper and lower sets of contacts, the upper set being normaly closed except during a very short interval at substantially the end of a cycle of operation of the machine. At that time, and after all of the water and solids have been dispensed, the timer operated cam 126 actuates switch 128 to open its upper set of contacts and close its lower set, to thereby break the circuit to a master relay 177. After a very short interval, cam 126 allows switch 128 to return to its illustrated normal condition, to break the circuit to the timer motor and end a cycle of operation. The master relay 177 has three sets of contacts 178, 179 and 180, the upper set of which is normally closed and the other two sets of which are normally opened. When relay 177 is energized, contacts 178 are opened, and the lower sets of contacts 179 and 180 are closed.

A second relay 181 acts as a control relay which is initially energized upon actuation of coin switch 18. Control relay 181 has an upper set of normally closed contacts, and a lower set of normally open contacts, with the upper set being opened and the lower set being closed upon energization of the relay. In addition to these described parts of the circuit, there may be provided a conventional coin block relay 182, which allows an element to block the coin slot and prevent the insertion of anything thereinto when relay 182 is for any reason deenergized. Also provided may be a pair of empty switches 183 which are normally in the illustrated position but actuable downwardly when either of the cup dispensers 24 or 25 is empty. In conjunction with switches 183, there may be provided an indicator light 184, which is automatically energized when the cup dispensers are empty, to indicate to an operator the empty condition of the apparatus. The two relays 177 and 181 may be contained within a suitable control box 185 mounted within the housing.

To now describe a cycle of operation of the machine, assume that the coffee, cream and sugar containers are all filled, and that the electrical control elements are in the conditions indicated in Fig. 16, that is, the conditions in which they remain between periods of operation of the dispenser. At the outset, an operator may actuate selector handle 17, to control whether cream or sugar will be supplied in the cup of coffee to be dispensed. For example, he may actuate the selector handle to a condition closing both switches 169 and 171, so that both cream and sugar will be delivered.

After making a selection, the operator inserts a proper coin into the coin controlled switch unit 18, to momentarily actuate that switch to a condition in which its upper contacts are closed and its lower contacts are open. The closure of the upper contacts of switch 18 closes energizing circuits to both the control relay 181 and latch solenoid 63 through the upper normally closed contacts 178 of master relay 177. The energization of control relay 181 closes a second circuit to relay 181 and latch solenoid 63, to keep these elements energized even after coin switch 18 returns to its illustrated normal condition. The opening of the upper contacts to relay 181 breaks the circuit to coin block relay 182 to automatically prevent the insertion of a second coin into the coin control mechanism.

As previously brought out, the energization of latch solenoid 63 actuates latch 57 to its released position of Fig. 7, to free the cup dispensing mechanism for a cup ejecting operation. Handle 19 at the outside of the housing may then be swung downwardly, to eject a single cup into the cup holding element 35. More specifically, the downward swinging movement of handle 19 acts through arm 50 and link 52 at the inner side of the door (see Fig. 7) to move slide member 46 downwardly from its normal Fig. 4 position to its Fig. 7 position. Such downward movement of slide member 46 acts through element 47 to swing element 48 in one direction between its full line and broken line positions of Fig. 8. For instance, if the parts are in their full line Fig. 8 position at the beginning of the cup ejecting operation, downward movement of elements 46 and 47 swings element 48 in a clockwise direction from the full line Fig. 8 position to the broken line position. This swinging or rotary movement of element 48 is transmitted through shaft 70 to member 81 at the rear of cup dispensers 24 and 25, to act through links 82 in a manner moving actuating arms 33 of the cup dispensers in opposite directions. This movement of the cup dispenser arms serves to eject a cup from one of the dispensers and cock the other dispenser for ejecting action on the next operation of the machine.

During downward movement of elements 46 and 47, reverse upward movement is prevented by engagement of ratchet-like element 88 with teeth 93. At the end of a downward actuation, cam surface 78 on member 76 cams pin 79 laterally, to deflect the connected element 47 laterally in a manner moving pin 67 positively out of the notch 69 in which it has been received during the cup ejecting operation.

At the very end of the downward movement of element 46, after the cup has been completely dispensed, element 87 engages actuating part 86 of switch 85, to actuate that switch in a manner closing its upper contacts (see Fig. 16) and opening its lower contacts. This closes a circuit through the upper contacts of switch 85, and the upper contacts of timer switch 128, and the lower contacts of coin switch 18 (which of course has returned to its normal illustrated condition) to master relay 177. Such energization of the master relay opens its upper contacts 178, to break the circuit to control relay 181 and latch solenoid 63. Also, the energization of master relay 177 closes a holding circuit through contacts 179 to the master relay itself, to maintain the relay energized even after switch 85 returns to its illustrated condition, and until the circuit is subsequently broken by timer switch 128. The lower contacts 180 of master relay 177 are connected into an energizing circuit to timer motor 121, which circuit also includes the lower contacts of coin switch 18. The switch 85 of course returns to its illustrated Fig. 16 condition as soon as cup ejecting handle 19 is released, to close the defined circuit to the timer motor 121, and cause that motor to commence a cycle of operation.

As the motor turns shaft 122 through one complete revolution, the various cams carried by that shaft act to open the valve 225 and operate the various control switches at predetermined times. The first part to be operated by the cams is valve 225, which is opened near the beginning of the cycle of rotation of shaft 122, to commence the delivery of hot water into mixing chamber 226, to flow downwardly therethrough and through chute 27 into the previously ejected cup. After the water valve has been thus opened by cam 127 to commence the delivery of water, the three cams 123, 124 and 125 act to close switches 118, 119 and 120 for predetermined intervals, to close the circuits to motors 108, 109 and 110 for corresponding intervals (assuming that selector switches 169 and 171 are both closed) so that these three motors act to drive the corresponding screws 30 to feed from containers 29 and into funnel or mixing chamber 226 metered amounts of coffee, cream and sugar. After switches 118, 119 and 120 have broken the circuits to the coffee, cream and sugar motors, cam 127 retains valve 225 open for a short interval and then allows it to close, to terminate the delivery of water.

After the water and powders have all been dispensed, timer switch 128 is actuated by its cam 126, to break the circuit to master relay 177 and stop the operation of motor 121. To attain this result, cam 126 temporarily actuates switch 128 to open its upper contacts and close its lower contacts. The opening of the upper contacts breaks the circuit to master relay 177, while the closing of the lower contacts closes a new circuit to the timer motor through the lower contacts of switch 85, and the lower contacts of coin switch 18. The motor then continues to operate for a short period until cam 126 allows return of switch 128 to its illustrated normal condition, to break the circuit through its lower contacts to motor 121, and stop the operation of that motor. All of the parts are then in their original condition, and are thus prepared for a subsequent coin controlled dispensing operation.

In connection with switch 85, it is noted that the formation of this switch in the illustrated manner to have two sets of contacts acts to prevent an operator from causing more than a single drink to be dispensed, by holding the handle 19 downwardly in its actuated position. That is, since the switch 85, after being actuated to its upper position of Fig. 16, must return downwardly to its illustrated normal condition before the timer motor circuit can be closed, the timer cannot dispense a drink until such return of switch 85. After handle 19 has been allowed to move upwardly to a sufficient extent to thus return this switch 85 to its normal position, the ratchet element 89 prevents reverse downward movement of handle 19, so that the switch cannot be again actuated to effect the second dispensing operation.

I claim:

1. A dispensing machine comprising a housing, a container for holding a material to be dispensed and adapted to be moved into and out of said housing and to a predetermined active position in which the container remains during operation of the machine, a rotary dispensing element rotatably carried by said container and operable to feed said material therefrom for delivery to a location accessible from the outside of the housing, a motor for driving said dispensing element, a detachable rotary drive connection between said motor and said dispensing element including interengageable members operatively connected to said motor and said dispensing element respectively and movable into and out of driving interengagement, a support for said container, and a mounting connection releasably holding said container in said active position on said support, said mounting connection including first interfitting means near a first side of the container movable into and out of holding interengagement solely by generally horizontal movement of the container and acting when thus interengaged to retain the container against upward movement, and second interfitting means near an opposite side of the container movable into and out of holding interengagement by generally vertical movement of said opposite side of the container and operable to retain the container against horizontal movement to release said first interfitting means.

2. A dispensing machine as recited in claim 1, in which said members forming the drive connection comprise bevel gears near said opposite side of the container.

3. A dispensing machine comprising a housing, a container for holding a material to be dispensed and adapted to be moved into and out of said housing and to a predetermined active position, a rotary dispensing element rotatably carried by said container and operable to feed said material therefrom for delivery to a location accessible from the outside of the housing, a motor for driving said dispensing element, a detachable rotary drive connection between said motor and said dispensing element including interengageable gears operatively connected to said motor and said dispensing element respectively, said gears being constructed to automatically cam the gear which is connected to the dispensing element out of power transmitting interengagement with the other gear in response to the development of excessive resistance to the turning of said dispensing element, said dispensing element and container being free for movement with said dispensing element gear when it is thus cammed out of power transmitting engagement with the other gear.

4. A dispensing machine as recited in claim 3, including a mounting connection holding said container in substantially said active position but permitting said movement of the container, the dispensing element and said dispensing element gear for disengaging the drive connection.

5. A dispensing machine as recited in claim 4, in which said two gears forming the drive connection are bevel gears disengageable by upward movement of a portion of the container.

6. A drink dispensing machine comprising a housing, means carried by the housing operable to dispense a quantity of water into a drinking receptacle, a plurality of containers for holding additional ingredients of a drink and adapted to be moved into and out of said housing and each to a predetermined active position in which it remains during operation of the machine, a support in the housing on which said containers are supported in said active positions, a plurality of rotary feed screws rotatably mounted in said containers respectively and operable to feed said additional ingredients from the containers for mixture with said water, individual motors for driving said feed screws respectively and mounted at the underside of said support, individual shafts extending upwardly from said motors, first bevel gears driven about generally vertical axes by said shafts, and second bevel gears connected to said feed screws for driving them about generally horizontal axes and adapted to mesh with said first gears and be driven thereby when the containers are in said active positions, said bevel gears having teeth adapted to cam the second gears upwardly out of meshing engagement with the first gears in response to the development of excessive resistance to turning of said screws.

7. A drink dispensing machine comprising a housing, means carried by the housing operable to dispense a quantity of water into a drinking receptacle, a plurality of containers for holding additional ingredients of a drink and adapted to be moved into and out of said housing and each to a predetermined active position in which it remains during operation of the machine, a support in the housing on which said containers are supported in said active positions, a plurality of rotary feed screws rotatably mounted in said containers respectively and operable to feed said additional ingredients from the containers for mixture with said water, individual motors for driving said feed screws respectively and mounted at the underside of said support, individual shafts extending upwardly from said motors, first bevel gears driven about generally vertical axes by said shafts, second bevel gears connected to said feed screws for driving them about generally horizontal axes and adapted to mesh with said first gears and be driven thereby when the containers are in said active positions, and releasable mounting connections holding said containers in said active positions on said support, each of said connections including parts connected to the support and to a front portion of a container adapted solely by virtue of rearward movement of the container to move into an interfitting engagement retaining the container against upward displacement, and each connection including additional parts connected to the support and to a rear portion of the container and movable into interfitting engagement by downward movement of the rear of the container after said rearward movement thereof.

8. A drink dispensing machine as recited in claim 7, in which said bevel gears have teeth adapted to cam the second gears upwardly out of meshing engagement with the first gears in response to the development of excessive resistance to turning of said screws, said additional parts of said connections being constructed to allow upward deflection of the containers when said second gears are cammed upwardly.

9. A drink dispensing machine comprising a housing, means carried by the housing operable to dispense a quantity of water into a drinking receptacle, a plurality of containers for holding additional ingredients of a drink and adapted to be moved into and out of said housing and each to a predetermined active position in which it remains during operation of the machine, a supporting structure in the housing on which said containers are supported in said active positions, a plurality of rotary dispensing elements carried by said containers respectively for feeding said additional ingredients therefrom for mixture with the water, individual motors for driving said dispensing elements respectively, detachable rotary drive connections between said motors respectively and said dispensing elements including interengageable members operatively connected to said motors and dispensing elements and movable into interengaging driving relation by movement of said containers into said active positions, and detachable mounting connections for holding the containers in said active positions and including parts movable into interfitting holding engagement solely by virtue of the container movement to said active positions, said parts acting when thus interengaged to retain the containers against movement upwardly from said support.

10. A drink dispensing machine comprising a housing, means carried by the housing operable to dispense a quantity of water into a drinking receptacle, a plurality of containers for holding additional ingredients of a drink and adapted to be moved into and out of said housing and each to a predetermined active position in which it remains during operation of the machine, a supporting structure in the housing on which said containers are supported in said active positions, a plurality of rotary dispensing elements carried by said containers respectively for feeding said additional ingredients therefrom for mixture with the water, individual motors for driving said dispensing elements respectively, detachable rotary drive connections between said motors respectively and said dispensing elements including interengageable members operatively connected to said motors and dispensing elements and movable into interengaging driving relation by movement of said containers into said active positions, and detachable mounting connections for holding the containers in said active positions, each of said mounting connections including first parts connected to the front portion of one of the containers and to said support structure and movable into interfitting engagement solely by rearward movement of the container, said parts acting when thus interengaged to retain the container against movement upwardly from the support structure, and each of said mounting connections also including additional parts connected to the rear portion of a container and to said support structure and movable into interfitting engagement by downward movement of the rear of the container after said rearward movement of the container, said additional parts then being effective to retain the container against forward movement.

11. A drink dispensing machine as recited in claim 10, in which said support structure comprises a horizontal shelf in the housing, said first interfitting parts comprising a forward edge portion of said shelf and tongues projecting downwardly and then rearwardly from forward portions of the containers for reception beneath said shelf edge, said additional interfitting parts comprising lugs projecting downwardly from rear portions of said containers and receivable within apertures in said shelf.

12. A drink dispensing machine as recited in claim 11, in which said motors are mounted at the underside of said shelf, said interengageable members of each of said rotary drive connections comprising a first bevel gear driven by the motor and a second bevel gear meshing with the first gear in the active position of the associated container and acting to drive one of the dispensing elements, said gears being adapted to cam the second gear upwardly out of driving engagement with the first in response to the development of excessive resistance to rotation of the associated dispensing element, said second interfitting parts being constructed to allow upward movement of the rear portion of the associated container with said second gear as it is cammed upwardly.

13. A drink dispensing machine as recited in claim 10, in which said interengageable members of each of said rotary drive connections comprise a first gear driven by one of the motors and a second gear meshing with the first and driving said dispensing element, said gears being constructed to cam the second gear upwardly out of driving engagement with the first in response to the development of excessive resistance to rotation of the associated dispensing element, said second interfitting parts being constructed to allow upward movement of the rear portion of the associated container with said second gear as it is cammed upwardly.

14. A drink dispensing machine comprising a housing, an actuating handle manually operable at the outside of said housing, means for holding a supply of drinking containers in the housing, mechanism operable mechanically by said handle to successively dispense containers from said supply thereof, said mechanism including an element which is movable in a first direction by said handle to dispense a container and then returns in a reverse direction, said mechanism being constructed to deliver a container in response to movement of said element through a predetermined range of movement, means in the housing for delivering a drink into a dispensed one of said containers, and electrical control means responsive to movement of said handle to cause said last mentioned means to feed a drink into a dispensed container, said control means including an electric control switch actuable in response to movement of the handle but actuated only after movement of said element by the handle substantially entirely through said range.

15. A drink dispensing machine comprising a housing, an actuating handle manually operable at the outside of said housing, means for holding a supply of drinking containers in the housing, mechanism operable mechanically by said handle to successively dispense containers from said supply thereof, said mechanism including an element which is movable in a first direction by said handle to dispense a container and then returns in a reverse direction, said mechanism being constructed to deliver a container in response to movement of said element through a predetermined range of movement, means in the housing for delivering a drink into a dispensed one of said containers, electrical control means responsive to movement of said handle to cause said last mentioned means to feed a drink into a dispensed container, said control means including an electric control switch actuable in response to movement of the handle but actuated only after movement of said element by the handle substantially entirely through said range, and means preventing a reversal of the direction of movement of said element until it has moved through said entire range of movement in said first direction.

16. A drink dispensing machine comprising a housing, an actuating handle manually operable at the outside of said housing, means for holding a supply of drinking containers in the housing, mechanism operable mechanically by said handle to successively dispense containers from said supply thereof, said mechanism including an element which is movable in a first direction by said handle to dispense a container and then returns in a reverse direction, said mechanism being constructed to deliver a container in response to movement of said element through a predetermined range of movement, means in the housing for delivering a drink into a dispensed one of said containers, electrical control means responsive to movement of said handle to cause said last mentioned means to feed a drink into a dispensed container, said control means including an electric control switch actuable in response to movement of the handle but actuated only after movement of said element by the handle substantially entirely through said range, and means preventing a change in the direction of movement of said element after it has commenced to move in either said first direction or said reverse direction and until said element has moved through said predetermined range of movement.

17. A drink dispensing machine as recited in claim 16, including means for preventing manual actuation of the handle in said first direction, and coin responsive means for releasing said last mentioned means.

References Cited in the file of this patent

UNITED STATES PATENTS

| | | |
|---|---|---|
| 1,936,103 | Berry | Nov. 21, 1933 |
| 2,569,486 | Mills | Oct. 2, 1951 |
| 2,597,063 | Catanzano | May 20, 1952 |
| 2,614,738 | Mills | Oct. 21, 1952 |
| 2,615,596 | Blue | Oct. 28, 1952 |
| 2,621,838 | Price | Dec. 16, 1952 |
| 2,626,785 | Lewis et al. | Jan. 27, 1953 |
| 2,682,984 | Melikian et al. | July 6, 1954 |